US009653765B2

(12) United States Patent
Chase et al.

(10) Patent No.: US 9,653,765 B2
(45) Date of Patent: May 16, 2017

(54) GAS DIFFUSION ELECTRODES FOR BATTERIES SUCH AS METAL-AIR BATTERIES

(75) Inventors: Gregory V. Chase, Pasadena, CA (US); Dan D. Addison, Pasadena, CA (US); Mario Blanco, Temple City, CA (US); Kenji A. Sasaki, Pasadena, CA (US); Jasim Uddin, Pasadena, CA (US)

(73) Assignee: Liox Power, Inc., Pasadena, CA (US)

( * ) Notice: Subject to any disclaimer, the term of this patent is extended or adjusted under 35 U.S.C. 154(b) by 1170 days.

(21) Appl. No.: 13/386,872

(22) PCT Filed: Jul. 23, 2010
(Under 37 CFR 1.47)

(86) PCT No.: PCT/US2010/002079
§ 371 (c)(1),
(2), (4) Date: Sep. 7, 2012

(87) PCT Pub. No.: WO2011/011082
PCT Pub. Date: Jan. 27, 2011

(65) Prior Publication Data
US 2013/0089795 A1    Apr. 11, 2013

Related U.S. Application Data

(60) Provisional application No. 61/228,512, filed on Jul. 24, 2009, provisional application No. 61/294,439, filed on Jan. 12, 2010.

(51) Int. Cl.
*H01M 12/08*    (2006.01)
*H01M 4/04*    (2006.01)
(Continued)

(52) U.S. Cl.
CPC ......... *H01M 12/08* (2013.01); *H01M 4/0433* (2013.01); *H01M 4/0471* (2013.01);
(Continued)

(58) Field of Classification Search
None
See application file for complete search history.

(56) References Cited

U.S. PATENT DOCUMENTS 5,510,209 A    4/1996    Abraham et al.
6,280,871 B1 *  8/2001    Tosco ............... H01M 4/8605
                                              106/31.6
(Continued)

FOREIGN PATENT DOCUMENTS

EP              0292431 A2     11/1988
WO          WO-01/28013 A1      4/2001
WO       WO-2011/011082 A1      1/2011

OTHER PUBLICATIONS

International Search Report and Written Opinion issued by the European Patent Office as International Searching Authority for International Application No. PCT/US2010/002079 dated Nov. 5, 2010 (10 pages).

*Primary Examiner* — Barbara Gilliam
*Assistant Examiner* — Adam A Arciero
(74) *Attorney, Agent, or Firm* — Wilmer Cutler Pickering Hale and Dorr LLP

(57) ABSTRACT

The present invention generally relates to batteries and, in particular, to electrodes for use in batteries such as non-aqueous metal-air batteries, for example, lithium-air batteries, as well as in other electrochemical devices. Such devices may exhibit improved performance characteristics (e.g. power, cycle life, capacity, etc.). One aspect of the present invention is generally directed to electrodes for use in such devices containing one or more pores or channels for transport of gas and/or electrolyte therein, e.g., forming an open porous network. In certain embodiments, the electrolyte may be a gel or a polymer. In some embodiments, there may be network of such channels or pores within the electrode such that no active site within the electrode is (Continued)

greater than about 50 micrometers distant from a gas channel. In some embodiments, such systems may be created using electrodes containing gel or electrolyte polymers, and/or by forming electrodes having different wettabilities such that certain regions preferentially attract the electrolyte compared to other regions, thereby causing self-organization of the electrolyte within the electrode. Other aspects of the invention are generally directed to methods of making such batteries or electrochemical devices, methods of using such batteries or electrochemical devices, kits involving such batteries or electrochemical devices, or the like.

82 Claims, 6 Drawing Sheets

(51) Int. Cl.
H01M 4/86 (2006.01)
H01M 4/96 (2006.01)
H01M 6/14 (2006.01)
H01M 12/06 (2006.01)

(52) U.S. Cl.
CPC ....... *H01M 4/0473* (2013.01); *H01M 4/8605* (2013.01); *H01M 4/96* (2013.01); *H01M 6/14* (2013.01); *H01M 12/06* (2013.01); *Y02E 60/128* (2013.01); *Y02E 60/50* (2013.01); *Y10T 29/49108* (2015.01)

(56) References Cited

U.S. PATENT DOCUMENTS

| | | | | |
|---|---|---|---|---|
| 2002/0106564 | A1* | 8/2002 | Okawa | H01M 4/136 429/221 |
| 2007/0212583 | A1* | 9/2007 | Johnson | H01M 12/06 429/405 |
| 2008/0138696 | A1* | 6/2008 | Bartling | H01M 4/621 429/499 |
| 2009/0053594 | A1* | 2/2009 | Johnson | H01M 4/90 429/163 |
| 2009/0081557 | A1* | 3/2009 | Chen | H01M 4/382 429/337 |
| 2010/0239914 | A1* | 9/2010 | Mikhaylik | H01M 4/133 429/231.8 |

* cited by examiner

GAS DIFFUSION ELECTRODES FOR BATTERIES SUCH AS METAL-AIR BATTERIES

RELATED APPLICATIONS

This application is a national stage application of PCT/US2010/002079, filed on Jul. 23, 2010 and published as WO 2011/011082, which claims the benefit of U.S. Provisional Patent Application Ser. No. 61/228,512, filed Jul. 24, 2009, entitled "Lithium-Air Battery," by G, Chase, et al.; and of U.S. Provisional Patent Application Ser. No. 61/294,439, filed Jan. 12, 2010, entitled "Gas Diffusion Electrode Containing Stable Distribution of Air Channels and Non-Aqueous Metal-Air Battery Containing Same," by G. Chase, et al. Each of these is incorporated by reference herein in their entireties.

FIELD OF INVENTION

The present invention generally relates to batteries and, in particular, to electrodes for use in batteries such as metal-air batteries.

BACKGROUND

Demand for batteries with higher energy density, lower cost, or improved safety compared to the state of the art has led researchers to investigate metal-air batteries. Metal-air batteries, or metal-oxygen batteries, employ reactions between a metal negative electrode and an oxygen positive electrode. In non-aqueous metal-air batteries, the positive and negative electrodes are separated by an active ion-conducting non-aqueous electrolyte or other ion conducting medium. Typically, oxygen is not stored internally within the battery, but is accessed from the external environment through the positive electrode. As the battery discharges, oxygen diffuses through the electrolyte to the electrode where it reacts electrochemically.

A battery comprises an assembly of one or more electrochemical cells configured to provide output voltage and/or charge capacity. For the purposes of the present invention, the term "battery" will be used to describe electrochemical power generation and storage devices comprising a single cell as well as a plurality of cells. Also, the term "battery," as used herein, includes both primary and rechargeable batteries, unless otherwise noted.

Examples of metals used as negative electrode materials in metal-air batteries include lithium (Li), sodium (Na), magnesium (Mg), calcium (Ca), aluminum (Al), iron (Fe), and zinc (Zn). Because lithium has relatively high electropositivity and low molecular weight, the Li-air battery is a particularly promising technology for high energy density applications.

As an example of a metal-air battery, non-aqueous Li-air batteries are generally governed by the following overall reaction:

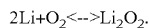

$$2Li + O_2 \longleftrightarrow Li_2O_2.$$

During the discharging process, lithium oxidizes in the negative electrode, and insoluble $Li_2O_2$, $Li_2O$, and/or $Li_2CO_3$ deposits in the pores of the positive electrode, and may displace electrolyte within the pores. During the charging process, $Li_2O_2$ decomposes, oxygen evolves into the environment and lithium regenerates in the negative electrode. Due to the gain and loss of oxygen during cycling, the mass of a Li-air cell varies inversely with the state of charge.

Based on the mass and density of $Li_2O_2$, Li-air batteries have maximum theoretical gravimetric and volumetric energy densities of approximately 3,500 Wh/kg and 8,000 Wh/l, respectively (excluding $O_2$), although these numbers are not reached practically. Accordingly, high theoretical capacity is a major driver for the development of Li-air battery technology. For comparison, current commercially available lithium-ion batteries achieve gravimetric and volumetric energy densities of 200 Wh/kg or 500 Wh/l, respectively.

The practically attainable energy density of Li-air batteries is lower than theoretical values due to factors such as the mass of electrochemically inactive components in the battery, such as the electrodes, separator, current collectors, housing, etc. The positive electrode includes the following operations in a Li-air battery: (1) it constitutes a transport system for $Li^+$, oxygen, and electrons to reaction sites; (2) it provides an electrode/electrolyte interfacial area ("active sites" or "electroactive sites") for electrochemical oxidation and reduction; and (3) it acts as a storage system for discharge products. Many practical limitations in the rate capability and discharge capacity of Li-air batteries arise from limitations of the gas diffusion electrode.

Li-air batteries are commonly fabricated with a flooded gas diffusion electrode, meaning the open pore volume of the electrode is filled with electrolyte. Previous investigations involving flooded gas diffusion electrodes have shown that pore utilization is related inversely to both discharge rate and the thickness of the flooded gas diffusion electrode. This phenomenon can be caused by low oxygen permeability in the electrolyte relative to that of $Li^+$. As discharge rate increases, the distribution of current within the bulk of the electrode becomes increasingly non-uniform. In operating regimes in which oxygen diffusion is rate limiting, the current distribution exhibits decreasing current density with increasing distance from the surface of the electrode in contact with air. The rate of deposition of discharge products in a given region of the electrode may be proportional to the current density in that region. Thus, at higher rates, products deposit faster near the surface of the electrode until a layer is formed that occludes the transport of oxygen, whereupon battery discharge ceases. According to this model, the cessation of discharge occurs sooner at higher rates of discharge, leading to lower overall capacity.

Some challenges that can exist with current Li-air batteries include insufficient rate capability and undesirably low capacity, which are each related to poor utilization of the gas diffusion electrode due the suboptimal transport of reactants and storage of solid discharge products. Li-air cells that achieve high capacity and high rate relative to the state-of-the art are therefore desired. In order to enable practical Li-air batteries for commercial energy storage applications, gas diffusion electrodes must be designed to solve problems such as the foregoing.

SUMMARY OF THE INVENTION

The present invention generally relates to batteries and, in particular, to electrodes for use in batteries such as metal-air batteries. The subject matter of the present invention involves, in some cases, interrelated products, alternative solutions to a particular problem, and/or a plurality of different uses of one or more systems and/or articles.

In one aspect, the present invention is generally directed to a metal-air battery, such as a lithium-air battery. According to one set of embodiments, the metal air battery includes a positive electrode comprising a material defining a first plurality of channels and a second plurality of channels a metal-containing negative electrode, and an ion conducting medium arranged between the positive electrode and the negative electrode. In some cases, the first plurality of channels are gas channels and the second plurality of channels may contain a non-aqueous electrolyte.

In another set of embodiments, the battery includes a positive electrode comprising a material defining active sites and an open porous network, a metal-containing negative electrode, and an ion conducting medium arranged between the negative electrode and positive electrode. In some cases, at least a portion of the open porous network contains a gas and a non-aqueous electrolyte. In certain embodiments, no portion of the gas contained within the open porous network is greater than about 50 micrometers distant from an active site.

The battery, in yet another set of embodiments, includes a positive electrode comprising one or more channels defined by a porous electrochemically inactive material, a metal-containing negative electrode, and an ion conducting medium arranged between the positive electrode and the negative electrode.

In still another set of embodiments, the battery includes a positive electrode comprising a porous electrically conductive material defining channels within the material such that no portion of the material is greater than about 50 micrometers distant from a channel, a metal-containing negative electrode, and an ion conducting medium arranged between the positive electrode and the negative electrode According to yet another set of embodiments, the battery includes a positive electrode comprising a porous electrically conductive material defining channels within the material, a metal-containing negative electrode, and an ion conducting medium arranged between the positive electrode and the negative electrode.

The invention, according to another aspect, is directed to a method. In one set of embodiments, the method includes acts of providing a first carbon having a first wettability relative to an electrolyte, providing a second carbon having a second wettability relative to the electrolyte where the first wettability and the second wettability are substantially different, forming, from the first carbon and the second carbon, an electrode having an open porous network, and filling at least a portion of the open porous network with the electrolyte.

The method, in accordance with another set of embodiments, includes acts of providing a first carbon having a first porosity, providing a second carbon having a second porosity, where the first porosity and the second porosity are substantially different, forming, from the first carbon and the second carbon, an electrode having an open porous network, and filling at least a portion of the open porous network with a non-aqueous electrolyte.

In another set of embodiments, the invention is directed to a lithium-air battery. In one set of embodiments, the lithium-air battery, after at least 20 charge-discharge cycles at a discharge current density of at least 0.1 mA/cm$^2$, exhibits a gravimetric energy density may be at least about 500 W h/kg of positive electrode, negative electrode, and ion conducting medium. In another set of embodiments, the lithium-air battery, after at least 20 charge-discharge cycles at a discharge current density of at least 0.1 mA h/cm$^2$, exhibits a volumetric energy density of at least about 500 W h/l of positive electrode, negative electrode, and ion conducting medium.

In another aspect, the present invention is directed to a method of making one or more of the embodiments described herein, for example, electrodes for use in batteries such as metal-air batteries. In another aspect, the present invention is directed to a method of using one or more of the embodiments described herein, for example, electrodes for use in batteries such as metal-air batteries.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
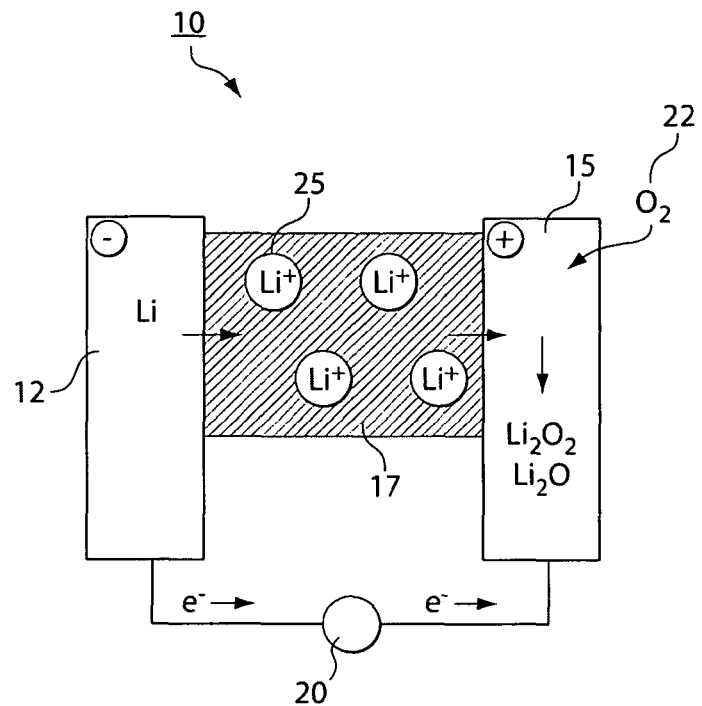
FIGS. 1A-1B are schematic diagrams of an electrode containing channels or open porosity, in one embodiment of the invention.

The present invention generally relates to batteries and, in particular, to electrodes for use in batteries such as non-aqueous metal-air batteries, for example, lithium-air batteries, as well as in other electrochemical devices. Such devices may exhibit improved performance characteristics (e.g. power, cycle life, capacity, etc.). One aspect of the present invention is generally directed to electrodes for use in such devices containing one or more pores or channels for transport of gas and/or electrolyte therein, e.g., forming an open porous network. In certain embodiments, the electrolyte may be a gel or a polymer. In some embodiments, there may be network of such channels or pores within the electrode such that no active site within the electrode is greater than about 50 micrometers distant from a gas channel. In some embodiments, such systems may be created using electrodes containing gel or electrolyte polymers, and/or by forming electrodes having different wettabilities such that certain regions preferentially attract the electrolyte compared to other regions, thereby causing self-organization of the electrolyte within the electrode. Other aspects of the invention are generally directed to methods of making such batteries or electrochemical devices, methods of using such batteries or electrochemical devices, kits involving such batteries or electrochemical devices, or the like.

One aspect of the invention is generally directed to electrochemical devices such as batteries, fuel cells, or the like containing one or more electrodes having pores or channels for the transport of gas and/or electrolyte therein. Examples of batteries include, but are not limited to, lithium-air batteries and other metal-air batteries such as those discussed below. In certain preferred embodiments, the battery is a non-aqueous metal air battery. In certain cases, such devices may exhibit higher power output and energy density over a wider range of operating conditions compared to the prior art. In some embodiments, an electrode may contain pores or channels therein that facilitates the transport of gases, ions, electrolyte, or the like within the electrode. The channels may also, in certain cases, contain or store discharge or waste products that are formed during use of the device. For example, discharge or waste products thus formed may be at least partially insoluble in the electrolyte, and may precipitate or be deposited within the channels. In some cases, as the discharge progresses, discharge product may accumulate within the electrode. For example, after being discharged (e.g., at a current density of 0.1 mA/cm$^2$), the electrode may contain at least about 10% by volume of discharge product (or other waste product), and in certain embodiments, the electrode may contain at least about 20%, at least about 30%, at least about 40%, at least about 50%, at least about 60%, at least about 70%, or at least about 80% by volume of discharge product.

Certain embodiments of the invention are directed to systems and methods for transporting sufficient $O_2$ or other gases to active sites within the electrode, which can allow for fast and/or complete discharge of the electrode in some cases. For example, $O_2$ solubility within an electrolyte may be increased, diffusion times may be decreased, or convection or an inhomogeneous electrode containing transport channels may be used, e.g., to limit the mean diffusion path length of $O_2$ through slow diffusion regions, obstructed regions within the electrode, tortuous pathways, etc.

Referring to FIG. 1A, an example of such an electrode is now discussed. As shown in this figure, device 10 (e.g., a lithium-air battery) includes positive electrode 12, negative electrode 15, ion conducting medium 17 arranged between positive electrode 12 and negative electrode 15, and load 20. In a lithium-air battery, negative electrode 15 may comprise or consist essentially of Li, while lithium ions 25 are transported through ion conducting medium 17 to react with oxygen 22 in positive electrode 12, forming discharge products such as $Li_2O_2$ or $Li_2O$.

Figure 1B:
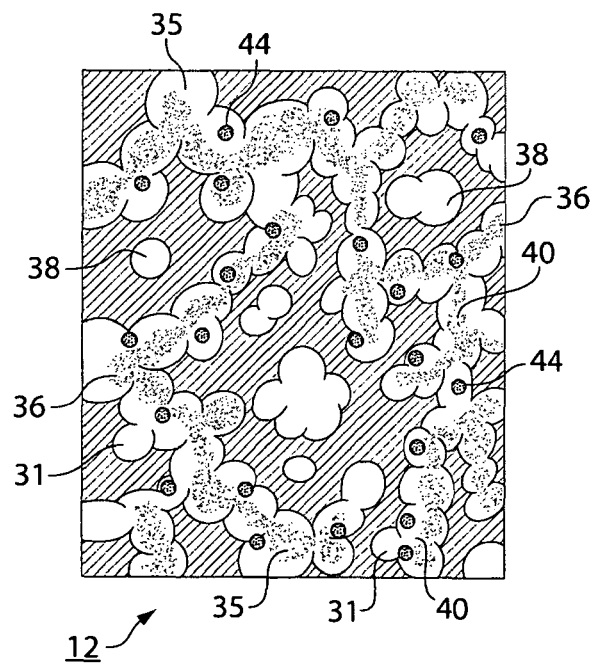

FIG. 1B shows an enlarged view of positive electrode 12 from FIG. 1A. In this figure, electrode material 30 includes pores 35 therein. Pores 35 may be present in a range of shapes or sizes. Most of the pores are connected to form channels through which gas, electrolyte, etc. can flow, although not all pores are necessarily connected, e.g., pore 38. In this figure, some channels are gas channels 31 through which $O_2$ or gas can flow, while other channels 36 are at least partially filled with an electrolyte. Due to the distribution of pores or channels, in this figure, no portion of electrode material 30 is more than 50 micrometers distant from a channel.

$O_2$ may be directly transported to an active site, and/or at least some of the $O_2$ may dissolve in the electrolyte and be transported to an active site via the electrolyte. In some cases, diffusion of $O_2$ through the electrolyte may be relatively rapid, e.g., due to the size and/or distribution of electrolyte within the electrode such as is discussed below, and/or due to the concentration of $O_2$ within the electrode. Typically, an active site is a location where reactions can occur between lithium ions, oxygen, and electrons. Thus, active sites include electrode/electrolyte interface areas (since some $O_2$ may be present within the electrolyte) as well as locations where gas channels, electrolytes, and electrode material are in contact. In some cases, discharge products are formed via reaction of lithium ions, oxygen, and electrons, and in certain embodiments, such discharge products are not soluble within the electrolyte, and thus may precipitate or deposit within the pores as a discharge product 44.

Thus, one set of embodiments is generally directed to an electrode having channels such as gas channels arranged in a defined spatial distribution with respect to the electrolyte and/or an electroactive surface or site, e.g., where reaction of ions, oxygen, electrons, etc. occurs. Examples of such reactions are discussed below. A "gas channel" refers to a gas phase pathway extending from the surface of the electrode into the electrode bulk. As mentioned, gas channels can be open to the external environment surrounding the electrode, and may thus allow transport of $O_2$, air, or other gases to occur, depending on the type of battery and the electrode.

Without wishing to be bound by any theory, it is believed that the provision of gas channels allows the electrode to be thicker (and hence the overall battery or device may be made thicker), while having improved power output and energy density. For example, in batteries such as Li-air batteries or other metal-air batteries as discussed herein, gases can react within the electrode, and channels for gases such as oxygen to flow therein allows the entire electrode, rather than only the external surface of the electrode, to participate in electrochemical reaction. Oxygen diffusion in the gas phase is typically rapid relative to ionic transport within the electrolyte. Thus, by reducing the mean diffusion path length of oxygen within the electrolyte, such batteries would be capable of discharging at higher rates while maintaining a comparatively uniform current distribution. In addition, in some embodiments, discharge or waste products may deposit more uniformly within the electrode, allowing higher electrode utilization.

In many prior art batteries and other devices, the electrolyte was kept externally of the electrode, and/or in some cases, the entire electrode was flooded with electrolyte. Surprisingly, it has been found that in various aspects of the present invention, an electrode having both electrolyte and gas channels therein dramatically increases the area of active sites available for reaction and thus, the amount of electrode available to participate in reaction. Such electrodes are useful, for example, in non-aqueous lithium-air batteries and other metal-air batteries. Thus, the electrode is not necessarily flooded with an electrolyte, but only a portion of the channels or pores within the electrode contain electrolyte, while other portions of the electrode allow transport of gases such as $O_2$, e.g., through pores or channel. A network of gas channels may also be able to hold more discharge product before clogging or blockage, and in addition, in some cases, a network of gas channels may allow some redundancy, e.g., full blockage of one channel may not be enough to block internal portions of the electrode if other channels still exist that access those portions which have not yet been blocked. In certain embodiments, the electrolyte may be distributed within the electrode such that the electrode contains both gas channels and channels containing electrolyte. Thus, by providing both electrolyte and gas channels within an electrode and increasing the active sites available for reaction during charging or discharging, batteries and other devices with surprisingly high performance characteristics may be achieved.

In certain embodiments, various structures of the electrode such as are disclosed herein allow for surprisingly high performance characteristics or utilization of the electrode. For example, higher amounts of utilization may lead to larger amounts of discharge or waste products accumulating within the electrode during discharge, longer periods of discharge, and/or higher gravimetric or volumetric energy densities. In some cases, the electrode may have a structure such that the electrode contains gas channels and channels containing electrolytes (which may be interconnected), such that the electrolyte is substantially evenly distributed within the electrode and gases such as oxygen can enter the electrode. For example, active sites within the electrode, where reactions can occur between lithium ions, oxygen, and electrons may be positioned within the electrode such that no portion of an active site is greater than about 100 micrometers distant from a channel, as discussed herein. Such structures are difficult to fabricate, and to the inventors' knowledge, no one has previously been able to successfully fabricate electrodes having these characteristics, owing to the difficulty in fabrication. However, various techniques for fabricating such structures are disclosed in detail herein.

In one set of embodiments, the channels take the form of porous columns (e.g., straight connected paths) or hierarchical networks within the electrode. The porous columns may be electrically insulating in certain embodiments. However, it should be understood that a channel need not be a smooth, cylindrical tube or passage. A channel may also, in some embodiments, be formed via a continuous pathway of interconnected regions or pores within the electrode. Such regions may be regularly or irregularly shaped, and may proceed in a tortuous or percolating fashion through the material forming the electrode.

The pores within the electrode can be micropores, mesopores, macropores, or any combination thereof. In certain embodiments, the pores within the electrode may be mesopores and/or macropores. Typically, microporous materials have a characteristic pore diameter of less than about 2 nm, mesoporous materials have a characteristic pore diameter between about 2 nm and about 50 nm, and macroporous materials have a characteristic pore diameter of greater than about 50 nm. For example, in some embodiments, at least about 5% of the pores within the electrode may be micropores, and in some embodiments, at least about 10%, at least about 15%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, etc. may be micropores. In certain cases, at least about 5% of the pores within the electrode may be mesopores, and in some embodiments, at least about 10%, at least about 15%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, etc. may be mesopores. In some instances, at least about 5% of the pores within the electrode may be macropores, and in some embodiments, at least about 10%, at least about 15%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, etc. may be macropores. It should be understood that the percentages of micropores, mesopores, macropores may be chosen to sum to 100% of the pores.

In another set of embodiments, the pores within the electrode may have a characteristic pore diameter of at least about 50 nm, at least about 100 nm, at least about 150 nm, at least about 200 nm, or at least about 300 nm. Any suitable technique may be used to determine or estimate the characteristic or average pore diameter of a porous electrode, e.g., SEM, TEM, BET, or the like.

As used herein, "open pore volume" means the volume of the dry (solvent or electrolyte free) electrode that is void (pore) space, excluding unconnected cavities, and the "open porosity" is the ratio of open pore volume to the total electrode volume. For example, in certain embodiments, as discussed below, an electrode is formed using a porous material (e.g., porous carbon), wherein the porosity of the material is such that at least about 10% by volume of the entire electrode is open pore volume. In other embodiments, the open porosity can be greater than about 15%, greater than about 20%, greater than about 25%, greater than about 30%, greater than about 35%, greater than about 40%, greater than about 45%, greater than about 50%, greater than about 55%, greater than about 60%, greater than about 65%, greater than about 70%, greater than about 75%, greater than about 80%, greater than about 85%, greater than about 90%, or more of the entire electrode is contained within pores within the material. In certain embodiments, the electrode may have an open porosity between about 15% and about 99%. In some cases, the open porosity of material may not exceed about 95%, about 90%, about 85%, about 80%, about 75%, about 70%, about 65%, about 60%, about 55%, about 50%, about 45%, about 40%, about 35%, or about 30%.

In such porous materials, at least some of the pores may be interconnected, thereby creating channels passing within the electrode that may in some cases extend to a surface of the electrode, thereby allowing access to the external environment surrounding the electrode. For instance, at least about 15% by volume, at least about 20%, at least about 30%, at least about 40%, at least about 50%, at least about 60%, at least about 70%, at least about 80%, at least about 90%, or substantially all of the pores within a porous material may be interconnected to create channels that are open to the external environment surrounding the electrode. In certain embodiments, pore sizes are distributed such that the mean pore size decreases with increasing distance from the gas channel.

Thus, in such electrodes, channels may extend from the surface of the electrode into the electrode bulk. In some cases, a channel can also contain one or more of a gas, an electrolyte, a gel, a polymer, a discharge product or other waste product, etc. For instance, in an undischarged electrode, the open pore volume may be filled by either electrolyte or gas channels; during use, a channel may become blocked, for example, due to electrolyte or discharge product, as discussed below.

In certain embodiments, the channels are arranged within the electrode material such that no portion of the active sites or regions defined by the electrode material is greater than about 100 micrometers distant from a channel, for example, from a gas channel. In other embodiments, the channels may be arranged within the electrode material such that no portion of an active site is greater than about 75 micrometers, greater than about 50 micrometers, greater than about 30 micrometers, greater than about 25 micrometer, greater than about 20 micrometers, greater than about 10 micrometers, or greater than about 5 micrometers distant from a channel. The active site may be present on the surface of the electrode material. The active site is typically a location where reaction between ions such as $Li^+$, oxygen, and electrons can occur, and in some cases, may be present at an interface between an electrolyte and an electrode material. In some cases, the mean distance between an active site and the nearest gas/electrolyte interface may be less than half the thickness of the electrode. In another set of embodiments, the mean minimum distance between a channel (e.g., of gas and/or electrolyte) and the material is no greater than about 100 micrometers, no greater than about 75 micrometers, no greater than about 50 micrometers, no greater than about 25 micrometers, no greater than about 20 micrometers, no greater than about 15 micrometers, no greater than about 10 micrometers, or no greater than about 5 micrometers. The "mean minimum distance" is the average of the minimum distances between each point of the material and the closest channel (e.g., a gas channel), and can be estimated in some cases, e.g., using analysis of SEM or TEM images. Examples of techniques for making such channels are discussed in detail below.

Due to the presence of the channels, the size of the electrode can be made to be larger, for example, while maintaining relatively high utilization, e.g., as discussed above. For example, the electrode may have a minimum dimension of at least 50 micrometers, at least about 100 micrometers, at least about 200 micrometers, at least about 300 micrometers, at least about 400 micrometers, at least about 500 micrometers, at least about 600 micrometers, at least about 750 micrometers, at least about 1000 micrometers, or more in some cases. The "minimum dimension" is the smallest distance that two parallel plates surrounding the electrode can be brought together, i.e., regardless of the shape or orientation of the electrode positioned between the parallel plates.

In some cases, channels within the electrode can be used to store discharge products or other waste products, at least according to some embodiments. For example, insoluble products formed during reaction may be deposited within the channels. As a specific non-limiting example, in a lithium-air battery, discharge products such as $Li_2O_2$, $Li_2O$, and/or $Li_2CO_3$ may be deposited within the channels of the electrode. In some cases, the discharge products may be deposited within the channel until the flow of gas or fluids through the channels slows or stops, thereby limiting or preventing active sites accessed by such channels from further participating in such reactions.

According to certain embodiments, over the course of discharge, the buildup of discharge or waste product may occlude and/or obstructs gas transport within the gas channels, e.g., by depositing within the channels, and reducing or blocking paths for $O_2$ diffusion (in either the gaseous or liquid phase), thus increasing the tortuosity between reservoirs of $O_2$ (e.g. the external environment, potentially conditioned prior to exposure to the cell) and active electrochemical sites within the electrode which are $O_2$ sinks or sources on cell discharge and charge, respectively. The accumulation of discharge product in non-uniform or more generally undesirable ways can limit both the rate and extent of discharge. Thus, certain embodiments of the invention are directed to electrodes containing channels for gas transport throughout the electrodes. The channels can prevent, reduce, and/or inhibit obstruction by the accumulation of discharge or other waste product. These channels may be 3-dimensional network in some instances. Such channels and/or networks can, in some cases, reduce the diffusion length of $O_2$ through the material which can become occluded during the course of discharge.

Accordingly, as a specific non-limiting example, one set of embodiments of the invention is generally directed to batteries such as lithium-air batteries containing such electrodes. For example, a lithium-air battery can include a lithium negative electrode, an oxygen positive electrode containing channels, and a non-aqueous $Li^+$ conducting electrolyte or other ion conducting medium arranged between the positive and negative electrodes. In certain embodiments, the oxygen positive electrode may be an electrode comprising an electronically conductive material having open porosity, with a non-aqueous $Li^+$ conducting electrolyte partially filling said open porosity, and a plurality of gas channels partially encompassing and distributed within said open porosity. For example, the electrode may have a thickness greater than 50 micrometers with the channels arranged such that the mean distance between an active site and the nearest gas phase/electrolyte interface is less than 25 micrometers at any state of charge.

In some embodiments, the channels can be used to transportions such as lithium cations ($Li^+$) to actives sites within the electrode, thereby allowing in some cases for relatively fast and complete discharge of the electrode. This process may be facilitated by relatively fast ion transport through the electrolyte, which may be of the solid, liquid, or gel phases (or some combination thereof in series or parallel), as is discussed below.

The channels, in some embodiments, can be formed out of electrochemically inactive materials and/or may be devoid of discharge product, at least initially. In certain embodiments, the channels may have a surface which inhibits nucleation of discharge product crystals precipitating out of solution. In some cases, an electrolyte can fill the channels during discharge, thereby allowing an unobstructed path for gas diffusion of oxygen, etc. in the electrolyte throughout discharge.

The cathode or positive electrode can be formed out any suitable material, according to certain aspects of the invention. The material for the electrode may be chosen, in some embodiments, to be an electrical conductor or an electrical insulator, depending on the application and the engineering requirements, e.g., for overall electrical conductivity of the electrode and/or the elimination of the possibility of discharge product buildup, potentially even in deep discharge. For example, the electrode may be formed out of an electrically conductive material, and in some cases, the electrode may be formed out of a material that is porous, e.g., as previously discussed. Porous materials may be useful, for example, to ensure that the integrity of any gaseous or liquid phase channels, for example $O_2$ channels, or other channels as discussed above, etc. are maintained, e.g., throughout the course of discharge.

Compositions suitable for use as the conductive material include, but are not limited to, carbon, electronically conducting polymers, metals and metal oxides, or the like. For example, in certain embodiments, the electrically conductive material may comprise or consist essentially of carbon. The carbon may be a porous carbon and/or a graphitized carbon. The carbon can be, for example, a carbon in the form of a high surface area and/or a porous matrix, e.g., having porosities such as those discussed above. In some cases, as discussed below, the electrically conductive material may be formed using a carbon-forming species that when cured or otherwise treated, forms a species consisting essentially of carbon. In some cases, the carbon thus formed is porous.

Examples of electronically conducting polymers include, but are not limited to, poly(acetylene), poly(aniline), poly(pyrrole), poly(3,4-ethylenedioxythiophene) (PEDOT), or the like. Examples of metals and metal oxides include, but are not limited to, lithium oxides such as $LiCoO_2$, $LiNiO_2$, $LiV_2O_5$, $LiFePO_4$, $LiV_6O_{13}$, $LiMn_4O_9$, or $LiMn_2O_4$. Other oxides may also be used, e.g., in cases where an ion other than lithium is used, for example, Na, Mg, Ca, Al, Fe, Co, Ce, Nb, Ru, or Zn.

To prevent to accumulation of discharge product within the material, the electrically conductive material can be chosen so as to have an electrically insulating surface, to be somewhat phobic to the electrolyte, and/or to be nucleation resistant to dissolved or solvated discharge or other products. In certain embodiments, the cathode is electrically conducting, and/or may contain components or additives that are electrically conducting, for example, metals or carbon nanotubes or nanofibers.

In some cases, acceptable ion access to active sites within the electrode is maintained by using suitable electrolyte transport channels, e.g., in channels within the electrode that contain electrolyte. For example, such channels can help to ensure that buildup of discharge product within the channels does not inhibit further reaction, and/or to reduce the mean diffusion path length through the base electrolyte. For instance, the channels may include solid or gel electrolyte rods or sheets, or contiguous regions of solid electrolyte powder (sintered or unsintered), channels containing electrically insulating components so that the surface of the porous material is electrochemically inactive, channels containing liquid electrolyte phobic regions, and/or channels that are nucleation resistant to dissolved discharge products.

For example, in some embodiments, the electrode includes a solid ion-conducting ceramic, for example, a solid $Li^+$-conducting ceramic. Specific non-limiting examples of such ceramics include ceramics of the LISICON (Lithium Super-Ionic CONductor) type, such as lithium aluminum germanium phosphate (LAGP) or lithium aluminum titanium phosphate (LATP). Additional examples include lithium-conducting polymers, which may be electrically insulating, and/or electrically conducting but not catalytic to oxygen reduction reactions (ORR), and/or polymers able to resist nucleation of discharge product, for example, to prevent the accumulation of discharge product in or on the channel. Examples of such lithium-conducting polymers include, for example, poly(ethylene oxide) (PEO).

In one set of embodiments, the electrically conductive material may be chosen so as to have an electrically insulating surface or regions so that the surface of the porous material is electrochemically inactive. In another set of embodiments, the electrically conductive material may be chosen so as to be somewhat phobic to the electrolyte, for instance, so that there is little or no availability on the surface of the material for formation or deposition of discharge product or other waste product. In yet another set of embodiments, the electrically conductive material may be chosen so as to be nucleation resistant to dissolved or solvated discharge or other products. For instance, the surface of the material may be treated to at least partially resist the formation of crystals of discharge product or other waste product. For instance, for carbon, the surface may be treated using surface graphitization known to those of ordinary skill in the art to render the surface more resistant to deposition or crystallization of discharge product or other waste product.

In one set of embodiments, the electrode contains channels that contain an electrolyte. The electrolyte may allow $O_2$ and/or ions such as lithium ions to be transported within the electrode. For example, the electrolyte can be a $Li^+$-conducting electrolyte, or an electrolyte able to conduct an ionized form of the material of the other electrode, for example, sodium ions, magnesium ions, calcium ions, aluminum ions, iron ions, zinc ions, or other ions formed from the electrode, depending on the embodiment. In some cases, the electrolyte, or a portion thereof, may not allow electron transport to occur, thereby causing the electrons to be diverted through an external load circuit, which can be harnessed to produce power.

In some cases, the electrolyte can also be arranged between the positive electrode and the negative electrode, e.g., the electrolyte may be in fluid and/or ionic communication with both the positive electrode and the negative electrode. In other cases, there may be an ion conducting medium arranged between the positive electrode and the negative electrode, and the electrolyte may be in fluid and/or ionic communication with the ion conducting medium. The ion conducting medium may have a different composition than the electrolyte, and in some cases, the ion conducting medium is preferentially permeable to certain ions but not others within the electrolyte. For example, the ion conducting medium may be relatively permeable to lithium ions but substantially impermeable to other ions in the electrolyte other than lithium ions, or at least the permeability of the walls to other ions in the electrolyte is at least 2, 3, 4, or more orders of magnitude less than the permeability of lithium ions. (Similarly, in other embodiments, the ion conducting medium may be permeable to sodium ions but not to other ions that are present, or to magnesium ions, calcium ions, etc.) In various embodiments, the ion conducting medium may have any suitable composition such as those described below with reference to electrolytes. In one embodiment, the ion conducting medium is a polymer-ceramic composites.

In one set of embodiments, a protected anode or negative electrode is used. As used herein, a "protected" anode is an anode that is "protected" from ions and species other than the species forming the anode. For example, in a lithium-air battery, the anode may be exposed to lithium ions but not to other ions or species. Such protection may be created, for example, using an ion conducting medium as discussed above, e.g., where the ion conducting medium is conductive to lithium ions but may be substantially impermeable to ions other than lithium ions.

In one embodiment, a positive electrode contains channels containing electrolyte, which also surrounds a portion of the positive electrode and contacts the negative electrode. In another embodiment, a positive and negative electrode can be in communication via an ion conducting medium arranged between the positive electrode and the negative electrode, where the positive electrode contain channels containing electrolyte.

In some embodiments, the electrode is only partially filled with electrolyte in order to maximize surface area between the electrolyte and gas phase (e.g., to increase the rate of $O_2$ solvation on discharge or gassing on charge), and/or to minimize $O_2$ transport path length between the gas phase and active sites within the electrode. In some embodiments, such partial filling of the electrode by the electrolyte may also allow room for discharge product to accumulate in the electrode, e.g., as discussed herein.

In one set of embodiments, the electrolyte may become distributed within the electrode such that the electrode contains both gas channels and channels containing electrolyte, e.g., with open pore volumes such as those described herein. In some cases, the distribution of gas channels and channels containing electrolyte may be substantially uniformly distributed. For example, the distribution may be such that the electrode contains no imaginary spherical regions greater than 500 micrometers in diameter that does not contain at least a portion of a gas channel and a portion of a channel containing an electrolyte, and in some cases, the electrode may contain no imaginary spherical regions greater than 400 micrometers in diameter, greater than 300 micrometers in diameter, greater than 200 micrometers in diameter, greater than 100 micrometers in diameter, greater than 75 micrometers in diameter, greater than 50 micrometers in diameter, or greater than 25 micrometers in diameter that does not contain at least a portion of a gas channel and a portion of a channel containing an electrolyte. Examples of techniques for producing such electrodes are discussed in more detail below.

In some embodiments, at least about 10% by volume of the channels within the electrode are filled with electrolyte (i.e., at least about 10% of the open porosity of the electrode contains electrolyte), and in other cases, at least about 15%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, etc. of the electrode are filled with an electrolyte. In some cases, no more than about 90%, no more than about 85%, no more than about 80%, no more than about 75%, no more than about 70%, no more than about 65%, no more than about 60%, no more than about 55%, no more than about 50%, no more than about 45%, no more than about 40%, or no more than about 35% of the channels are filled with electrolyte, i.e., such that some of the channels within the electrode are gas channels. In one set of embodiments, the electrolyte fills between about 25% and about 75% of the open porosity of the electrode.

Electrolyte contained within a cathode may also be referred to as a catholyte. The catholyte may or may not be the same as the ion conducting medium external of the electrode.

The electrolyte, in certain embodiments, is not electrically conductive, and in some cases, the electrolyte is non-aqueous. The electrolyte is typically a liquid, although in some cases, the electrolyte may be a gel, a polymer, or other materials. For example, in certain embodiments, a gel can be used as the electrolyte within the electrode. Stabilization of gas channel distribution and morphology over multiple cycles may be accomplished through the use of a gelled electrolyte, e.g., having the correct structural and rheological properties to prevent spontaneous leakage of solvent into gas channels. In some instances, the electrolyte contained within the electrode may be nucleation resistant to dissolved or solvated discharge or other products.

The electrolyte is formulated, in certain cases, to have sufficient elasticity to expand and contract as discharge product forms and decomposes within it. A variety of methods exist that can be readily used by the skilled artisan, and are suitable for fabricating an electrode containing gas channels stabilized by gelled electrolyte. One exemplary technique involves the application of a template or mold having a structure corresponding to the desired gas channel geometry to an electrode precursor material, e.g., as discussed herein.

Certain aspects of the present invention are generally directed to gels or polymers contained within an electrode, e.g., within channels or pores within an electrode, and techniques of making or using such electrodes. For example, one set of embodiments are generally directed to methods of in situ polymerization of a gel or a polymer within pores of an electrode. In another set of embodiments, an electrode may be constructed that, when exposed to an electrolyte, causes the distribution of electrolyte therein such that the electrode contains transport pathways for both gas and ions within the electrolyte. In some cases, the electrode may be formed from a carbon or a carbon-forming species. Non-limiting examples of such techniques are discussed in detail below.

As mentioned, in some cases, the electrode may include a polymer network that acts as an electrolyte or a catholyte. For example, the electrolyte contained within the electrode may be ionically conducting, inherently and/or due to the presence of a solvent contained within the electrolyte that is able to conduct ions. As a specific non-limiting example, a $Li^+$-conducting electrolyte may inherently be $Li^+$ conducting, and/or the electrolyte may contain a solvent in which $Li^+$ can dissolve. In some cases, the electrolyte may also be electron conducting, e.g., to allow reaction to occur between ions such as $Li^+$, $O_2$, and electrons to occur. The electrolyte can be inherently electron conducting, and/or the electrolyte can contain components or additives that are electrically conducting, for example, metals or carbon nanotubes or nanofibers. In other embodiments, however, the electrolyte is electrically insulting (e.g., carries little or no electrons) while being ionically conductive. For instance, the conductivity of the electrolyte to ions may be at least two, three, or four orders of magnitude greater relative to electrons.

Figure 2A:
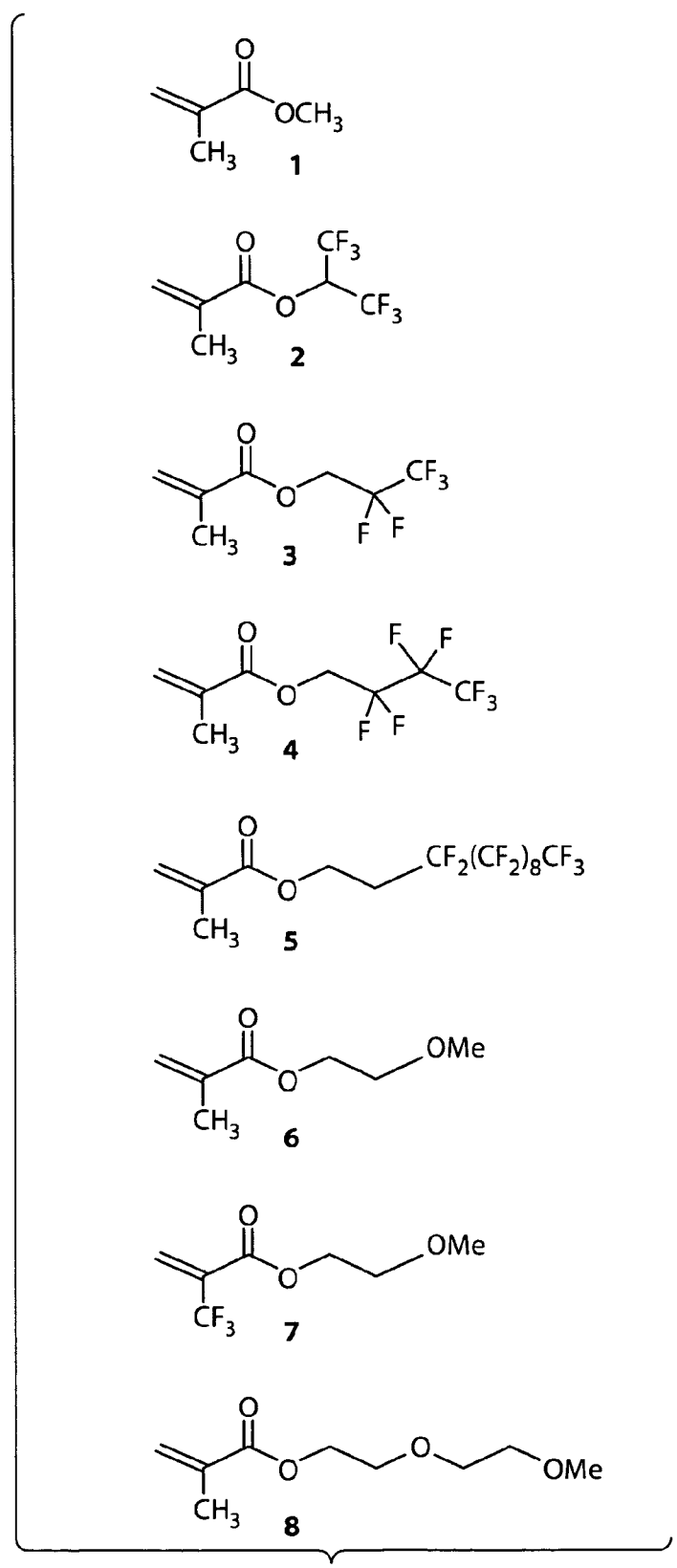
FIGS. 2A-2E illustrate various compounds for use in certain gels, in accordance with another embodiment of the invention.
Figure 2B:
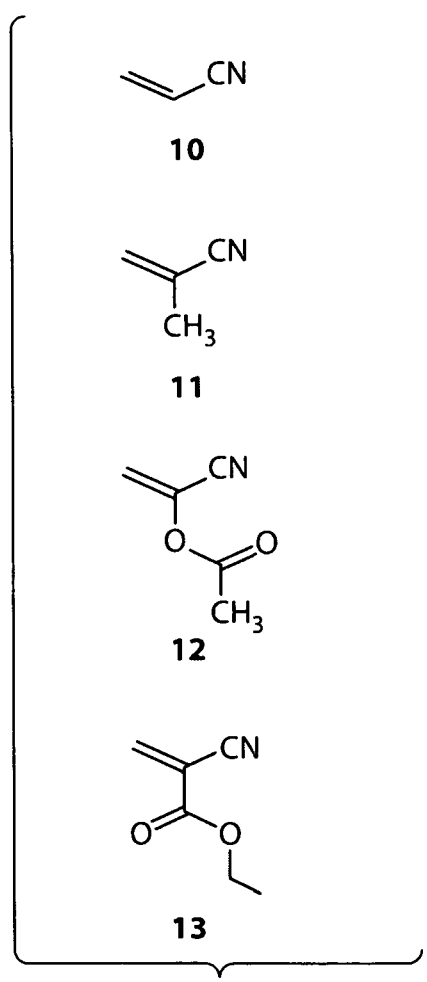
Figure 2C:
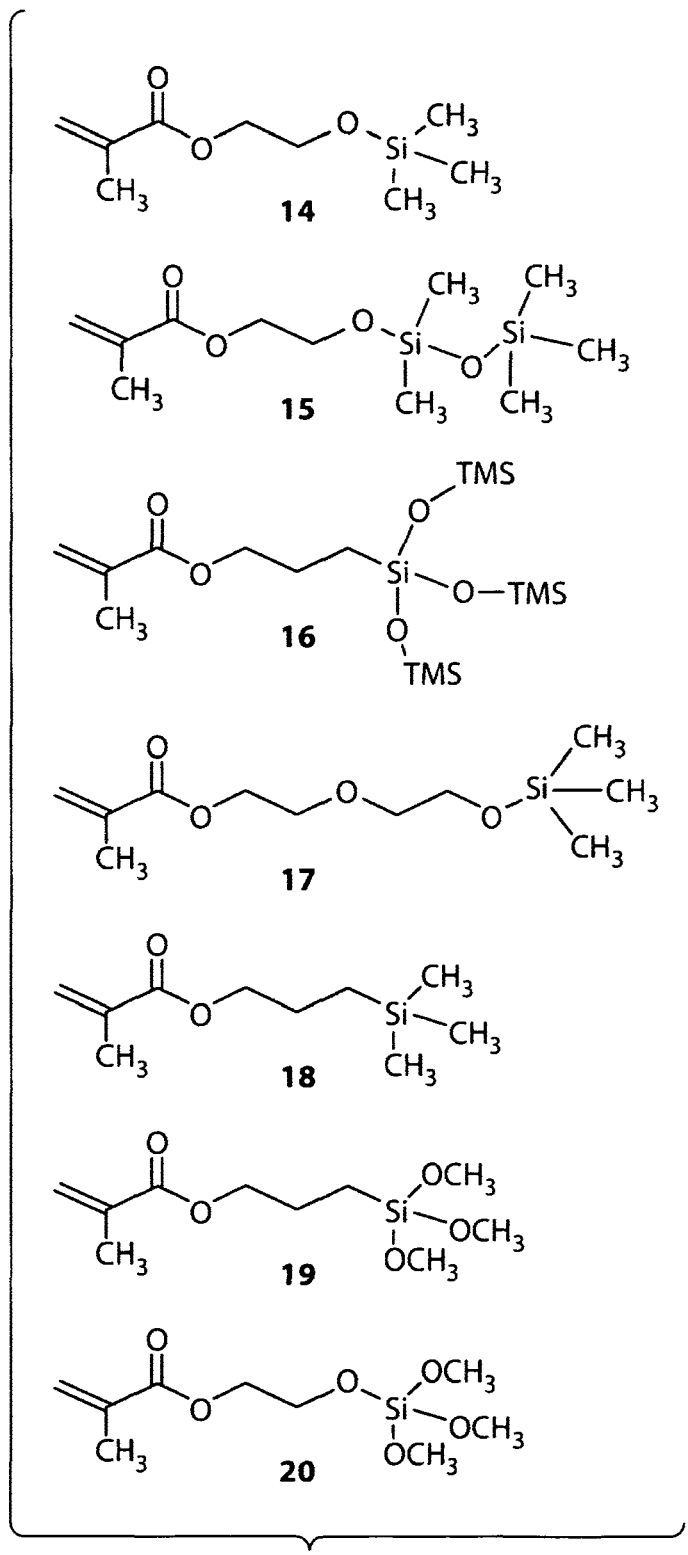
Figure 2D:
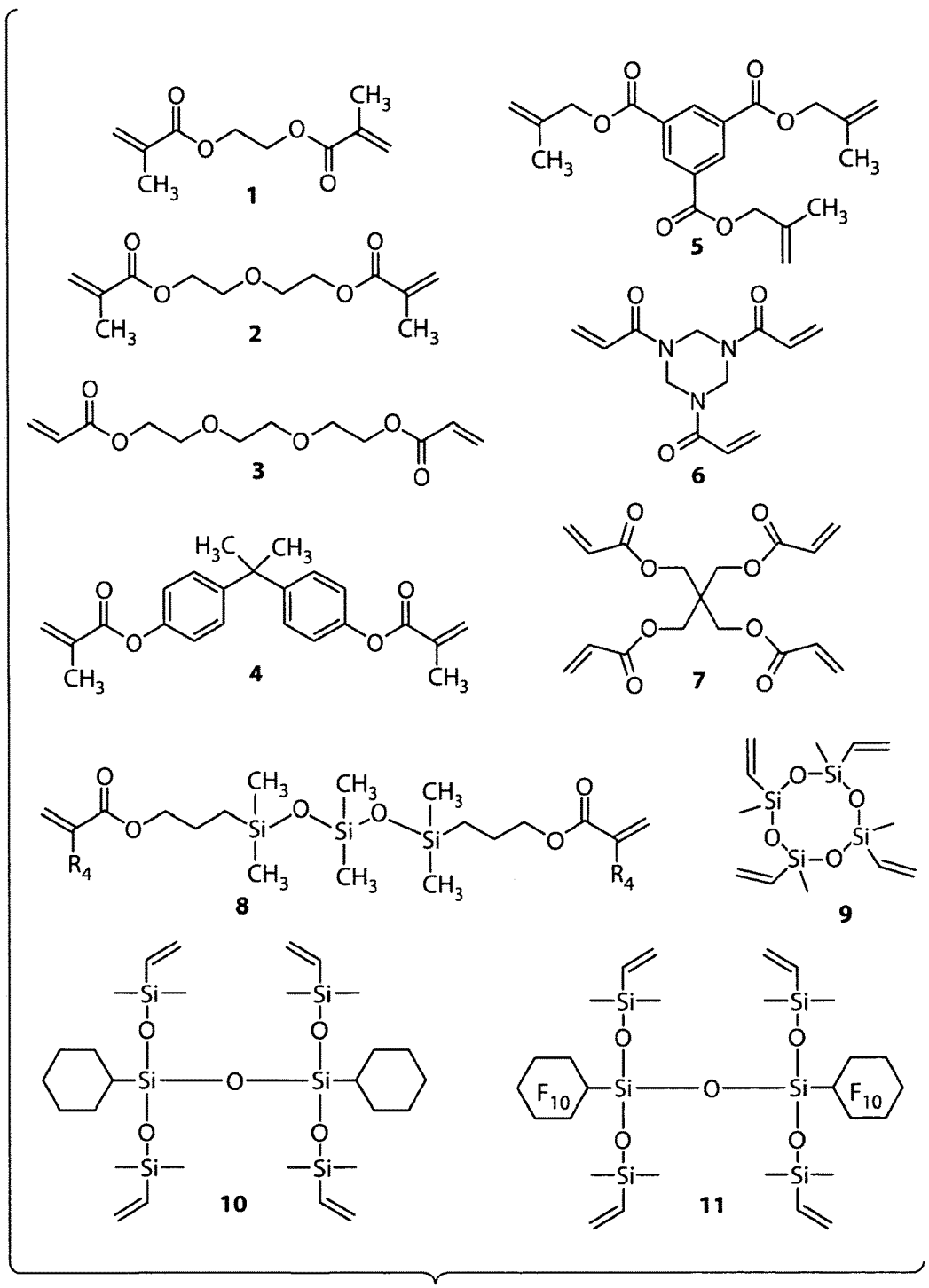
Figure 2E:
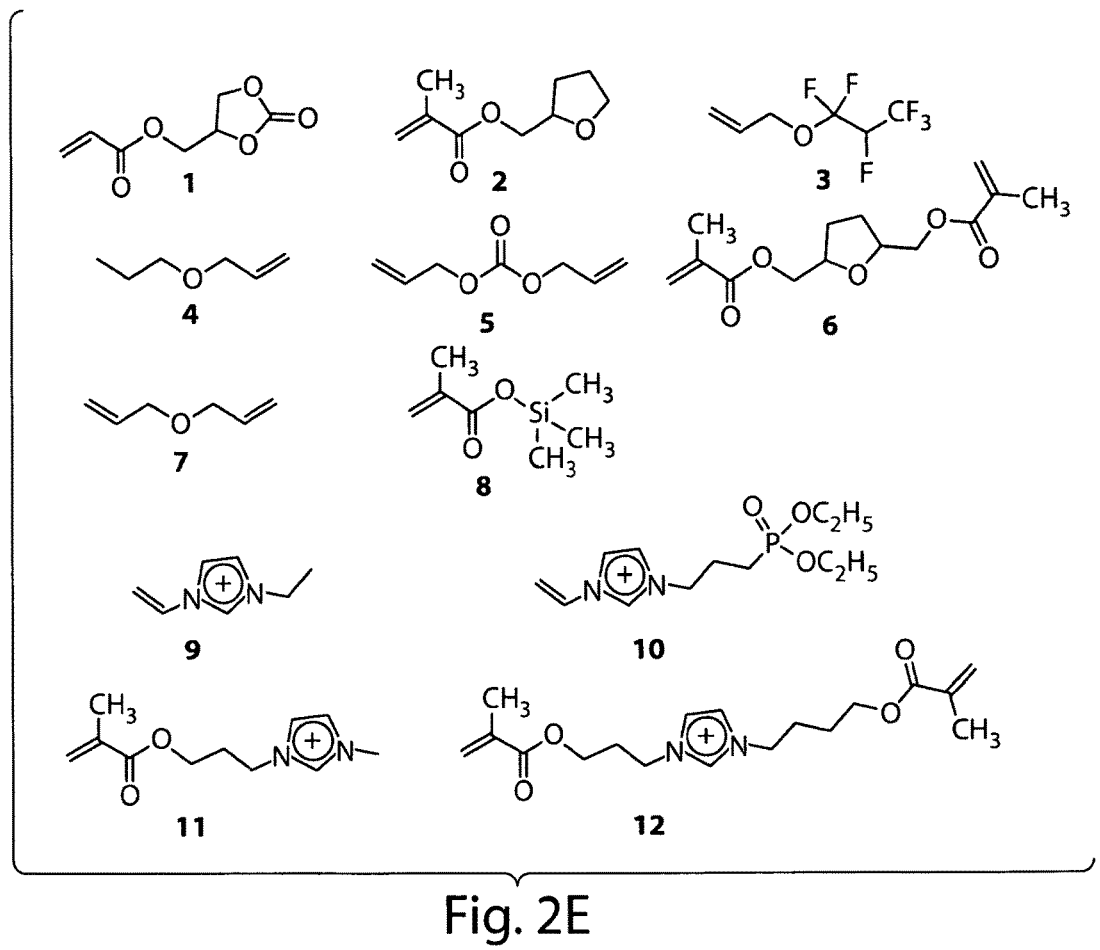

Gel polymer electrolytes that can be used include, but are not limited to, poly(acrylonitrile) (PAN), poly(ethylene oxide) (PEO), poly(vinylidene fluoride) (PVDF), poly(dimethylsiloxane) (PDMS), poly(ethylene glycol) dimethyl ether (PEGDME), poly(vinyl chloride) (PVC), poly(vinyl siloxane) (PVS), poly(vinylpyrrolidone) (PVP), poly(ethylene glycol)diacrylate (PEGDA), poly(methyl methacrylate) (PMMA), siloxanes, silanes, or the like, and/or combinations thereof. The polymer in the gel can also be an electronically conducting polymer, such as poly(acetylene), poly(aniline), poly(pyrrole), poly(3,4-ethylenedioxythiophene) (PEDOT), or the like. In one set of embodiments, the gel may include an acrylate, an acrylonitrile, and/or a siloxane acrylate, using a cross-linking agents such as ethylene glycol diacrylate (EGDA) or siloxane diacrylate. Additional non-limiting examples of acrylates, acrylonitriles, siloxane acrylates, and cross-linking agents are shown in FIGS. 2A-2D, respectively. Examples of polymerizable solvent monomers are shown in FIG. 2E.

In some cases, the gel contains a solvent and/or electrolyte salts. Solvent or salt compositions may be selected on the basis of properties such as high oxygen solubility, high lithium ion conductivity, low volatility, hydrophobicity, chemical compatibility with oxygen, and superoxide and/or high anodic stability. Suitable examples of aprotic solvents include, but are not limited to, ethylene carbonate (EC), propylene carbonate (PC), dimethyl carbonate (DMC), diethyl carbonate (DEC), dipropyl carbonate (DPC), tetrahydrofuran (THF), 1,2-dimethoxyethane (DME), ethyl methyl carbonate (EMC), butylene carbonate, gamma-butyrolactone, solvents containing sulfones, ionic liquids, ionic melts, or the like. In certain embodiments, the gel electrolyte contains ionic liquids with perfluorinated cations and/or anions. Suitable examples of lithium salts include, but are not limited to, $LiPF_6$, $LiBF_4$, $LiC(SO_2CF_3)_3$, $LiN(SO_2CF_3)_2$, $LiAsF_6$, $LiClO_4$, lithium bis(oxalato)borate (LiBOB), lithium difluoro(oxalato)borate (LiDFOB), lithium bis(trifluoromethane sulfone)imide (LiTFSI), or the like.

One aspect of the invention is generally directed to methods of making electrodes such as those described herein. The electrode precursor material can be a liquid or gel, and in certain embodiments, the precursor material is cured to form an electrode. The precursor may include, for example, carbon or a carbon-forming species, polymers and/or monomers, solvents, electrolyte salts, cross-linking agents, or the like. For example, in one set of embodiments, an electrode precursor, when hardened to form a solid, forms a porous solid, e.g., inherently, and/or due to other components within the precursor. For instance, the electrode precursor may include carbon particles, carbon powder, carbon dust, carbon nanotubes, carbon nanofibers, etc., or another carbon-forming species that, upon curing, partially congeals to form a porous matrix of carbon. In some cases, the carbon may have a shape that is substantially spherical; in other cases, however, at least some of the carbon may have a shape that is non-spherical. For example, the carbon may have an aspect ratio (largest dimension to smallest dimension) of at least about 2, at least about 3, at least about 5, at least about 10, etc.

In one set of embodiments, the carbon forms an electrode containing channels or pores that, when exposed to electrolyte, the electrolyte partially fills the channels or pores. In some cases, due to differences in wettability as previously discussed, fills certain regions within the channels while not filling other regions within the channels. For instance, the electrolyte may associate with a first region of a channel having a first wettability while not associating with a second region of the channel having a second wettability different from the first wettability. If the regions of different wettability are distributed, for example, substantially uniformly within the electrode, or such that the regions are relatively evenly positioned or distributed within the electrode, then the electrolyte may also distribute or "self-organize" in such a fashion. Thus, for example, due to differences in wettability, the electrolyte, upon exposure to the channels, may become distributed such that no portion of the material or the active sites within the channel are positioned greater than about 100 micrometers, etc., distant from a gas channel, as previously discussed, and/or such that the electrode has an open porosity percentage as discussed herein. In another set of embodiments, the electrolyte within the channel may be distributed such that at least about 30% of the electrolyte by volume within the electrode is ionically connected to an outer surface of the electrode, and in other cases, such that at least about 40%, at least about 50%, at least about 60%, at least about 70%, at least about 80%, at least about 90%, or substantially all of the electrolyte is ionically connected to an outer surface of the electrode.

In one set of embodiments, an electrode may be fabricated from two or more carbons (and/or carbon-forming species). The carbons may be selected to have different shapes, sizes, wettabilities, porosities, or the like. For instance, a first carbon may have a first porosity and a second carbon may have a second porosity, where the first porosity and the second porosity are substantially different. As used herein "wettability" is determined with reference to an electrolyte of interest, and can be determined using contact angle measurements or the like. For example, a first carbon may have a first size, wettability, porosity, etc. and a second carbon may have a second size, wettability, porosity, etc. that is substantially different, e.g., such that, using TEM, SEM, contact angle measurements, etc., one of ordinary skill in the art can identify the carbons as being different. For instance, if different wettabilities are used, the resulting electrode may have regions that preferentially attract the electrolyte therein and regions that do not attract the electrolyte therein (or attract the electrolyte to a different degree), which may be useful in distributing electrolyte within the electrode, e.g., as previously discussed.

A carbon or a carbon-forming species, when cured, can form a species consisting essentially of carbon, for example porous carbon and/or graphitized carbon. For example, the carbon-forming species may be carbon (e.g., activated carbon), and/or the carbon-forming species may contain additional ingredients, such as additives or binders, that are driven off or otherwise removed (e.g., oxidized) during the curing process. Examples of binders include, but are not limited to, polymers such as poly(vinylidene fluoride-co-hexafluoropropylene) (PVDF-HFP) or poly(tetrafluoroethylene) (PTFE). The binder may also be a conjugated polymer, such as poly(acetylene), poly(aniline), poly(pyrrole), poly(3,4-ethylenedioxythiophene) (PEDOT), or the like. Non-limiting examples of additives include anion receptors such tris(pentafluorophenyl)borane (TPFPB), or redox shuttles such as 2,5-di-tert-butyl-1,4-dimethoxybenzene (DDB).

Curing of the precursor to form an electrode can include any suitable solidification or hardening technique, and may be physical and/or chemical. For example, in one set of embodiments, the precursor is heated to initiate curing, e.g., for certain types of thermosetting polymers. The precursor may also be cured by exposure to certain types of radiation, e.g., ultraviolet radiation. In yet another set of embodiments, an initiator may be added to a precursor to cause polymerization of a monomer to occur.

The electrode, in certain cases, can be formed from a liquid or gel precursor such as previously described, although in other embodiments, the electrode may be formed using other techniques, and/or the electrode or electrode precursor may be initially provided as a solid.

As mentioned, in certain embodiments, the electrolyte contained within the electrode may be different than the ion conducting medium surrounding the electrode, although in other embodiments, these may have the same composition. In some embodiments, the electrolyte contained within the electrode is able to resist or repel the ion conducting medium, for instance, keeping the ion conducting medium external of the cathode. For example, the electrolyte contained within the electrode can be a non-liquid electrolyte, such as a gel or a polymer as previously described. In certain cases, the electrolyte contained within the electrode may be phobic to the ion conducting medium. For example, the electrolyte and the ion conducting medium may be substantially immiscible and phase separate, or one or both of the electrolyte and the ion conducting medium may be a gel or a polymer that resists dissolution in the other component.

In one set of embodiments, the pressure within the external environment to which an electrode is exposed may be pulsed or otherwise cyclically altered. Such alterations can, in some embodiments, extend the conformal coating of electroactive cathode material with the electrode, and/or increase the phase boundary between the external environment surrounding the electrode and electrolyte within the channels of the electrode.

As mentioned, various aspects of the invention are directed to lithium-air batteries and other metal-air batteries. Although lithium is often used as the negative electrode-active metal, other aspects of the invention are directed to metal-air batteries utilizing other negative electrode-active metals, including but not limited to sodium (Na), magnesium (Mg), calcium (Ca), aluminum (Al), iron (Fe), zinc (Zn), or the like. Accordingly, it should be understood that the descriptions herein with reference to a lithium-air battery are by way of example only, and in other embodiments of the invention, other metals are used instead of and/or in addition to lithium, including those described above.

A lithium-air battery typically includes a lithium-metal negative electrode (or anode), a positive electrode (or cathode) where reaction with oxygen occurs (e.g., from air; sometimes referred to as an "oxygen positive electrode"), and an electrolyte or other ion conducting medium in fluid communication with both the positive electrode and the negative electrode. Typically, the lithium and oxygen react to produce lithium oxides:

$$2Li+O_2 \longleftrightarrow Li_2O_2$$

$$4Li+O_2 \longleftrightarrow 2Li_2O$$

These reactions can be divided into two half-cell reactions occurring at the negative electrode and the positive electrode during discharge, respectively (during charging, these reactions are reversed). For example, $Li_2O_2$ proceeds as:

$$Li \rightarrow Li^+ + e^-$$

$$2Li^+ + O_2 + 2e^- \xrightarrow{} Li_2O_2,$$

and $Li_2O$ proceeds as:

$$Li \rightarrow Li^+ + e^-$$

$$4Li^+ + O_2 + 4e^- \xrightarrow{} 2Li_2O.$$

During discharge, lithium ions flow from the negative electrode through the electrolyte and/or the ion conducting medium to react with oxygen at the positive electrode to form products such as lithium oxide ($Li_2O$) or lithium peroxide ($Li_2O_2$) which deposits at the positive electrode; this is coupled to the flow of electrons from the negative electrode to the positive electrode through a load circuit, which can be harnessed to produce power. In some cases, other species can also be formed, such as lithium carbonate ($Li_2CO_3$), e.g., via side reactions of various lithium/oxygen species with carbon in the electrode. During charging, this process is reversed; electrons flow from the positive electrode to the negative electrode to reverse these half-cell reactions. However, some discharge products, such as $Li_2O$ or $Li_2CO_3$ cannot readily be converted back to lithium, and thus may build up as insoluble waste within the electrode.

Thus, as discussed above, electrodes containing gas or other channels may be particularly useful in such batteries, since the flow of oxygen into the electrode allows a greater percentage of the electrode to participate in reaction, rather than only the surface of the electrode. In addition, as discharge products such as $Li_2O_2$, $Li_2O$, and/or $Li_2CO_3$ are formed, they can deposit within the channels of the electrode, and in some cases, such that the flow of gas or fluids through the channels becomes blocked. Although some channels may eventually become blocked during use, a greater percentage of the electrode may be utilized (e.g., thereby collecting discharge product) before the blockage of the channels within the electrode becomes sufficiently large as to limit use of the electrode. For example, blockage of at least about 10%, at least about 20%, at least about 30%, at least about 40%, at least about 50%, at least about 60%, at least about 70%, at least about 80%, or at least about 90% by volume of the channels can occur before the electrode is no longer useful. In addition, in some cases, the blockage may be reversed under suitable conditions, i.e., thereby producing a rechargeable battery. In some embodiments, solvation of discharge products or other waste products may allow the rechargeability of such electrochemical systems.

Thus, one set of embodiments of the invention is generally directed to a rechargeable battery or other rechargeable electrochemical device. During discharge and charge, the accumulation and decomposition of $Li_2O_2$ and/or other products may result in displacement of the electrolyte within the channels, at least in certain embodiments. This displacement may cause changes in the dimensions and/or distribution of gas channels relative to the electrolyte and the active sites. In some embodiments, the mean distance through the electrolyte between a point at the gas phase/electrolyte interface and the nearest active site is less than 50 micrometers at a full state of charge, and in some cases, less than about 30 micrometers, less than about 25 micrometer, less than about 20 micrometers, less than about 10 micrometers, or less than about 5 micrometers. Some embodiments of the invention contemplate stabilizing this configuration throughout cycling so that the distribution is at least partially restored at the end of each discharge/charge throughout a plurality of cycles. For example, this stability may be maintained for more than 10 cycles, more than 25 cycles, more than 50 cycles, more than 75 cycles, or more than 100 cycles.

In some cases, relatively high energy densities can be achieved in the batteries and other electrochemical devices discussed herein, e.g., due to the gas channels within the electrode, which allow a larger percentage of the electrode to be utilized during charging or discharging. For example, the battery can have a gravimetric energy density (excluding $O_2$) of at least about 200 W h/kg of positive electrode, negative electrode, and ion conducting medium (i.e., excluding current collectors, the housing, inert structural elements, or other ancillary components of the battery) at a discharge current density of at least 0.1 mA/cm$^2$, at least 0.2 mA/cm$^2$, at least 0.5 mA/cm$^2$, 1 mA/cm$^2$, 2 mA/cm$^2$, or 5 mA/cm$^2$. In some cases, the gravimetric energy density may be at least about 500 W h/kg, at least about at least about 1,000 W h/kg, at least about 1,500 W h/kg, at least about 2,000 W h/kg, at least about 3,000 W h/kg, etc. In another set of embodiments, the battery may have a volumetric energy density of at least about 500 W h/l of positive electrode, negative electrode, and ion conducting medium at a discharge current density of at least 0:1 mA/cm$^2$, at least 0.2 mA/cm$^2$, at least 0.5 mA/cm$^2$, 1 mA/cm$^2$, 2 mA/cm$^2$, or 5 mA/cm$^2$, and in some cases, the volumetric energy density is at least about 1,000 W h/l, at least about 1,500 W h/l, at least about 2,000 W h/l, etc.

The term "pore utilization," as used herein, refers to the fraction of open pore volume that is filled with discharge product. The volumetric energy density of a battery may be bounded by the open porosity and pore utilization of the electrode in the fully discharged state. As a non-limiting example, an electrode characterized by 50% open porosity and 50% pore utilization in the discharged state would be composed of 25% discharge product by volume. If this electrode constituted 50% of the volume, the volumetric energy density would be approximately 1,000 Wh/l, assuming discharge proceeds at a discharge current density of at least 0.1 mA/cm$^2$, at least 0.2 mA/cm$^2$, at least 0.5 mA/cm$^2$, 1 mA/cm$^2$, 2 mA/cm$^2$, or 5 mA/cm$^2$, and $Li_2O_2$ is the only discharge product.

In another set of embodiments, an electrode precursor is hardened around a mold such that, when the precursor is solidified and removed from the mold, the electrode contains channels therein formed by the mold. Thus, the precursor may be selected so as to be capable of filling the void space around a template or a mold. After curing, e.g., by heat treatment, the mold or template is removed, thereby resulting in a solid material containing channels, which can be used as channels for gas or electrolyte, etc., as described herein.

The mold, in some embodiments, includes one or more pillars or other protrusions that the precursor may flow around. The pillars can have any suitable diameter, height, and/or spacing or "pitch." For example, in some cases, as previously described, the pillars are positioned within the mold such that, upon removal, no portion of the resulting electrode is greater than about 50 micrometers distant from a channel. For instance, the pillars may be spaced approximately 100 micrometers apart. In other embodiments, other pitch spacings can be used, e.g., to produce an electrode such that no portion of the electrode material is greater than about 75 micrometers, greater than about 50 micrometers, greater than about 30 micrometers, greater than about 25 micrometer, greater than about 20 micrometers, greater than about 10 micrometers, or greater than about 5 micrometers distant from a channel.

The void space created by the mold is, in some cases, at least partially filled with an electrolyte, e.g., a gel or a polymer electrolyte as is discussed herein. The electrolyte may be added to the channels after creation of the electrode. In some cases, the gel or polymer can be used to maintain continuity of the channels throughout the course of discharge.

In yet other embodiments, an electrode may be treated to form channels by mechanical drilling, chemical reaction, or the like. Other examples of suitable fabrication methods include, but are not limited to, soft lithography, micro-electro-discharge machining, laser micromachining, or the like.

In still another set of embodiments, the precursor may include a channel-forming component that forms channels within the precursor when the precursor is solidified. For example, the channel-forming component may include one or more hollow tubes. In some cases, the walls of the tubes are permeable to oxygen and partially or completely impermeable to the electrolyte, which can be used to ensure that the interior of the tubes is gaseous and thus has relatively high gas or $O_2$ transport. In some embodiments, however, liquid electrolyte may be allowed to seep into the interior of the tubes during inactive periods (for example, for walls made of materials that are not completely impermeable to the electrolyte) but then during use, positive pressure can be used to actively applied to return the tube interiors to the gaseous state. Such tubes could be, in certain embodiments, electrically active so as to facilitate $O_2$ reduction on the surface and/or as $O_2$ is transported from the interior of the tube to the surrounding matrix.

In some embodiments, the hollow tubes defined by walls can be formed from a polymer. For example, the tubes may be constructed of a solid or polymer (including solid polymer or gel polymer). Examples of such polymers include, but are not limited to, electronically conducting polymers, such as poly(acetylene), poly(aniline), poly(pyrrole), poly (3,4-ethylenedioxythiophene) (PEDOT), or the like.

In some cases, the walls of the tubes are permeable to ions such as lithium ions, and the walls in certain instances may at least partially resist passivation or the formation of crystals of discharge product or other waste product. The walls, in some cases, may be substantially impermeable to other ions in the electrolyte other than lithium ions, or at least the permeability of the walls to other ions in the electrolyte is at least 2, 3, 4, or more orders of magnitude less than the permeability of lithium ions. (Similarly, in other embodiments, the walls may be permeable to sodium ions but not to other ions in the electrolyte, or to magnesium ions, calcium ions, etc.) In some cases, the walls may be chosen so as to have an electrically insulating surface or regions so that the surface of the walls is electrochemically inactive. In another set of embodiments, the walls may be chosen so as to be somewhat phobic to the electrolyte, for instance, so that there is little or no availability for formation or deposition of discharge product or other waste product onto the walls. In yet another set of embodiments, the walls are chosen so as to be nucleation resistant to dissolved or solvated discharge or other products. For instance, the walls can be treated to at least partially resist the formation of crystals of discharge product or other waste product. Additional examples of such materials for the walls of the tubes are discussed herein, e.g., with reference to electrically conductive materials.

In certain cases, however, the channel-forming component may include an electrochemically inactive material. For example, a tube such as described above can be formed, at least in part, by an electrochemically inactive material. The electrochemically inactive material may be electrically insulating in some cases, and in certain embodiments, the electrochemically inactive material is porous, e.g., to allow passage of ions, oxygen, and/or electrons to occur. Non-limiting examples of such electrochemically inactive materials include silica.

In one set of embodiments, the gas channels may be stabilized throughout cycling is to control the wetting properties of the electroactive surface with respect to the solvent contained in the electrode. This can be accomplished, for example, by treating the electrode surface within gas channels to have low wettability compared to regions containing electrolyte. Techniques and materials for treating the electrode surface to control and/or alter its wetting properties include, but are not limited to, surface oxidation, fluorination, KOH activation, $CO_2$ activation, sulfanation, halogenation, and grafting.

In the batteries and other electrochemical devices described herein, other components, including materials in the negative electrode, the positive electrode, and/or electrolyte are not particularly limited beyond what is well known in the prior art and can be readily assembled by a person of ordinary skill in the art artisan into a functioning battery or other suitable electrochemical device including the appropriate current collectors, housing and other functional materials.

U.S. Provisional Patent Application Ser. No. 61/228,512, filed Jul. 24, 2009, entitled "Lithium-Air Battery," by G. Chase, et al.; and U.S. Provisional Patent Application Ser. No. 61/294,439, filed Jan. 12, 2010, entitled "Gas Diffusion Electrode Containing Stable Distribution of Air Channels and Non-Aqueous Metal-Air Battery Containing Same," by G. Chase, et al. are each incorporated herein by reference in their entireties.

The following examples are intended to illustrate certain embodiments of the present invention, but do not exemplify the full scope of the invention.

EXAMPLE 1

This example illustrates the synthesis of an in situ polymerized cathode having gas channels without solvent. First, a mixture of monomers with appropriate ratios was placed in a dry two-necked 250 ml round bottom flask containing a magnetic stir bar. The flask was then sealed and purge with argon, and then freeze-pump-thawed several times for complete degassing. A calculated amount of initiator was then added to the flask by a syringe. The reaction mixture was heated at 60° C. in a water bath for several hours until a viscous pre-gel was formed. The reaction mixture was then cooled at −78° C. for several hours to stop the polymerization. The cooled pre-gel was then allowed to reach the room temperature. A calculated amount of cross-linker and carbon was added to the pre-gel. Next, the composite mixture was mechanically stirred or sonicated to form a homogenous mixture.

The homogeneous composite pre-gel was then cured in two different ways to get an ionically conducting, robust composite gel with gas channels in it. In one method, the pre-gel was poured into a template having pillars (20 micrometers tall×500 micrometers in diameter with a 40 micrometer pitch or separation). The pre-gel containing template was degassed several times, then cured by heat or light under controlled conditions. The template was removed just before the gel became mechanically stable. After removing the template, the gel was cured for an extended period of time to produce a cathode with gas channels in it.

In another method, a homogeneous mixture of carbon, cross linker, and pre-gel was poured into a stainless steel or glass mold with precise thickness, then cured by heat or light under controlled conditions. The mechanically robust cathode sheet was then removed from the mold. The gas channels were engineered on the cathode by mechanical techniques, such as the mechanical drilling of channels into the cathode.

EXAMPLE 2

This example illustrates the synthesis of an in situ polymerized cathode with air channels, with solvent. The organic cathode with solvent was prepared the same way as without solvent method described above in Example 1 except that the monomers were mixed with a solvent in it. The solvent can be carbonate based molecular solvents, hydrophobic perfluorinated ionic liquids, poly(ethylene glycol), silane-based ionic solvents, or the like. In some cases, the solvent molecules can be co-polymerized with monomers and cross-linker to make it an integrated part of the cathode.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A metal-air battery, comprising:
a positive electrode;
a metal-containing negative electrode; and
an ion conducting medium arranged between the positive electrode and the negative electrode;
wherein the positive electrode comprises a porous material defining an electrode surface;
wherein the porous material is partially filled with a non-aqueous electrolyte to form one or more electrolyte regions and one or more gaseous regions;
wherein the one or more electrolyte regions provide diffusion pathways between the one or more gaseous regions and the electrode surface; and
wherein each point on the electrode surface in contact with the one or more electrolyte regions has at least one diffusion pathway having a distance of less than 50 micrometers.

2. The battery of claim 1, wherein the positive electrode has a thickness of at least about 200 micrometers and, after discharge at a current density of 0.1 mA/cm$^2$, contains at least about 10% by volume of discharge product.

3. The battery of claim 2, wherein the positive electrode contains at least about 20% by volume of discharge product after discharge.

4. The battery of claim 3, wherein the positive electrode contains at least about 30% by volume of discharge product after discharge.

5. The battery of claim 4, wherein the positive electrode contains at least about 40% by volume of discharge product after discharge.

6. The battery of claim 1, wherein the mean minimum thickness of the electrolyte regions is about 50 micrometers.

7. The battery of claim 1, wherein the mean minimum thickness of the electrolyte regions is about 25 micrometers.

8. The battery of claim 1, wherein the mean minimum thickness of the electrolyte regions is about 15 micrometers.

9. The battery of claim 1, wherein the mean minimum thickness of the electrolyte regions is about 10 micrometers.

10. The battery of claim 1, wherein the positive electrode has a thickness of at least about 200 micrometers.

11. The battery of claim 1, wherein the positive electrode has a thickness of at least about 300 micrometers.

12. The battery of claim 1, wherein the positive electrode has a thickness of at least about 400 micrometers.

13. The battery of claim 1, wherein the positive electrode has a thickness of at least about 500 micrometers.

14. The battery of claim 1, wherein the battery is a lithium-air battery.

15. The battery of claim 1, wherein the battery is a rechargeable battery.

16. The battery of claim 15, wherein the battery is able to be fully charged and fully discharged for at least 20 cycles.

17. The battery of claim 16, wherein the battery is able to be fully charged and fully discharged for at least 50 cycles.

18. The battery of claim 1, wherein the positive electrode comprises carbon.

19. The battery of claim 1, wherein the positive electrode comprises graphitized carbon.

20. The battery of claim 1, wherein the positive electrode comprises a polymer.

21. The battery of claim 20, wherein the polymer comprises poly(vinylidene fluorideco-hexafluoropropylene).

22. The battery of claim 20, wherein the polymer comprises poly(tetrafluoroethylene).

23. The battery of claim 20, wherein the polymer comprises a conjugated polymer.

24. The battery of claim 1, wherein the positive electrode comprises an electronically conducting polymer.

25. The battery of claim 1, wherein the positive electrode comprises a metal.

26. The battery of claim 1, wherein the positive electrode comprises metal oxide.

27. The battery of any claim 1, wherein the metal of the negative electrode comprises lithium.

28. The battery of claim 1, wherein the metal of the negative electrode comprises one or more of Na, Mg, Ca, Al, Fe, or Zn.

29. The battery of claim 1, wherein the ion conducting medium is able to conduct $Li^+$.

30. The battery of claim 1, wherein between about 25% and about 75% by volume of the porous material is filled with the electrolyte.

31. The battery of claim 30, wherein between about 25% and about 50% by volume of the porous material is filled with the electrolyte.

32. The battery of claim 30, wherein between about 50% and about 75% by volume of the porous material is filled with the electrolyte.

33. The battery of claim 30, wherein between about 40% and about 60% by volume of the porous material is filled with the electrolyte.

34. The battery of claim 1, wherein each point on the electrode surface in contact with one or more electrolyte regions has at least one diffusion pathway having a distance of less than 25 micrometers.

35. The battery of claim 1, wherein the porous material has a porosity of at least 30%.

36. The battery of claim 35, wherein the porous material has a porosity of at least 50%.

37. The battery of claim 36, wherein the porous material has a porosity of at least 70%.

38. The battery of claim 1, wherein the battery has a gravimetric energy density of at least about 200 W h/kg of positive electrode at a discharge current density of at least 0.1 mA/cm$^2$.

39. The battery of claim 38, wherein the battery has a gravimetric energy density of at least about 500 W h/kg of positive electrode at a discharge current density of at least 0.1 mA/cm$^2$.

40. The battery of claim 39, wherein the battery has a gravimetric energy density of at least about 1,000 W h/kg of positive electrode at a discharge current density of at least 0.1 mA/cm$^2$.

41. The battery of claim 1, wherein the battery has a volumetric energy density of at least about 500 W h/l of positive electrode at a discharge current density of at least 0.1 mA/cm$^2$.

42. The battery of claim 41, wherein the battery has a volumetric energy density of at least about 1,000 W h/l of positive electrode at a discharge current density of at least 0.1 mA/cm$^2$.

43. The battery of claim 42, wherein the battery has a volumetric energy density of at least about 2,000 W h/l of positive electrode at a discharge current density of at least 0.1 mA/cm$^2$.

44. The battery of claim 1, wherein the positive electrode is electrically conductive.

45. The battery of claim 1, wherein the porous material comprises mesopores.

46. The battery of claim 1, wherein the porous material comprises macropores.

47. The battery of claim 1, wherein the electrolyte and the ion conducting medium are identical prior to use of the battery.

48. The battery of claim 1, wherein the electrolyte and the ion conducting medium are not identical prior to use of the battery.

49. The battery of claim 1, wherein the ion conducting medium is permeable to Li+ and is impermeable to other species comprising the electrolyte.

50. The battery of claim 1, wherein the electrolyte is liquid.

51. The battery of claim 1, wherein the electrolyte comprises one or more of poly(acrylonitrile), poly(ethylene oxide), poly(vinylidene fluoride), poly(dimethylsiloxane), or poly(ethylene glycol) dimethyl ether.

52. The battery of claim 1, wherein the electrolyte is a gel.

53. The battery of claim 1, wherein the electrolyte includes one or more of LiPF$_6$, LiBF$_4$, LiC(SO$_2$CF$_3$)$_3$ LiN(SO$_2$CF$_3$)$_2$, LiCsF$_6$, LiClO$_4$, lithium bis(oxatlato)borate, or lithium difluoro(oxalato)borate.

54. The battery of claim 1, wherein the electrolyte comprises a solvent.

55. The battery of claim 54, wherein the solvent comprises a hydrophobic perfluorinated ionic liquid.

56. The battery of claim 54, wherein the solvent comprises a carbonate.

57. The battery of claim 56, wherein the carbonate is one or more of ethylene carbonate, propylene carbonate, dimethyl carbonate, diethyl carbonate, dipropyl carbonate, ethyl methyl carbonate, or butyl carbonate.

58. The battery of claim 54, wherein the solvent comprises one or more of tetrahydrofuran, 1,2-dimethoxyethane, or gamma-butyrolactone.

59. The battery of claim 54, wherein the solvent comprises a sulfone.

60. The battery of claim 1, wherein the positive electrode comprises first regions having a first wettability and second regions having a second wettability substantially different from the first wettability.

61. The battery of claim 1, wherein one of the electrolyte region forms a layer over the one or more surfaces of the positive electrode.

62. The battery of claim 1, wherein the porous material comprises porous particles and wherein at least some of the porous particles are substantially filled with electrolyte and at least some of the porous particles are filled with gaseous regions.

63. The battery of claim 1, wherein the porous material comprises a plurality of larger sized pores and a plurality of smaller sized pores and at least some of the smaller-sized pores contains the non-aqueous electrolyte.

64. The battery of claim 1, wherein the porous material comprises an electrochemically inactive material.

65. A method of making the battery of claim 1, comprising:
providing the metal-containing negative electrode,
providing the positive electrode, and
providing the ion conducting medium, wherein
providing the positive electrode comprises
providing a first carbon having a first wettability relative to an electrolyte;
providing a second carbon having a second wettability relative to the electrolyte, wherein the first wettability and the second wettability are substantially different;
forming, from the first carbon and the second carbon, an electrode having an open porous network; and
filling at least a portion of the open porous network with the electrolyte.

66. The method of claim 65, wherein the electrolyte is a gel.

67. The method of claim 65, wherein the electrolyte comprises a polymer.

68. The method of claim 65, wherein the first carbon is particulate and/or the second carbon is particulate.

69. The method of claim 68, wherein the first particulate carbon has a first average diameter and the second particulate carbon has a second average diameter substantially different from the first average diameter.

70. The method of claim 65, wherein the first carbon is a carbon nanotube.

71. The method of claim 65, wherein the first carbon and/or the second carbon has an aspect ratio of at least about 2.

72. The method of claim 65, wherein the act of forming an electrode comprises curing a mixture of a monomer, the first carbon, and the second carbon to form the electrode in a mold.

73. The method of claim 72, wherein the mold is constructed and arranged to define a plurality of hollow channels in the electrode when the electrode is removed from the mold.

74. The method of claim 72, wherein curing comprises exposing the mixture to an initiator able to react the monomer to form a polymer.

75. The method of claim 72, wherein the mixture is a liquid.

76. The method of claim 72, wherein the mixture further comprises a solvent.

77. The method of claim 72, wherein the mixture further comprises an electrolyte salt.

78. The method of claim 72, wherein the mixture further comprises a cross-linking agent.

79. The method of claim 72, wherein curing comprises heating the mixture to cause curing to occur.

80. The method of claim 72, further comprising forming a plurality of hollow channels in the electrode.

81. The method of claim 80, comprising mechanically drilling holes within the electrode to form the plurality of hollow channels.

82. A method of making the battery of claim, comprising:
providing the metal-containing negative electrode,
providing the positive electrode, and
providing the ion conducting medium, wherein
providing the positive electrode comprises
providing a first carbon having a first porosity;
providing a second carbon having a second porosity, wherein the first porosity and the second porosity are substantially different;
forming, from the first carbon and the second carbon, an electrode having an open porous network; and filling at least a portion of the open porous network with a non-aqueous electrolyte.

* * * * *